US012407987B2

(12) United States Patent
Ren et al.

(10) Patent No.: US 12,407,987 B2
(45) Date of Patent: Sep. 2, 2025

(54) SPEAKER DEVICE

(71) Applicant: AAC Microtech (Changzhou) Co., Ltd., Jiangsu (CN)

(72) Inventors: Zhang Ren, Changzhou (CN); Zhiwei Zhong, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 182 days.

(21) Appl. No.: 18/520,565

(22) Filed: Nov. 28, 2023

(65) Prior Publication Data

US 2025/0133347 A1 Apr. 24, 2025

Related U.S. Application Data

(63) Continuation of application No. PCT/CN2023/125334, filed on Oct. 19, 2023.

(51) Int. Cl.

| | |
|---|---|
| ***H04R 9/06*** | (2006.01) |
| ***H04R 1/24*** | (2006.01) |
| ***H04R 1/28*** | (2006.01) |
| ***H04R 7/12*** | (2006.01) |
| ***H04R 7/18*** | (2006.01) |
| ***H04R 9/02*** | (2006.01) |
| ***H04R 9/04*** | (2006.01) |

(52) U.S. Cl.
CPC ............... *H04R 9/025* (2013.01); *H04R 1/24* (2013.01); *H04R 1/2811* (2013.01); *H04R 7/12* (2013.01); *H04R 7/18* (2013.01); *H04R 9/043* (2013.01); *H04R 9/06* (2013.01); *H04R 9/063* (2013.01); *H04R 2209/022* (2013.01)

(58) Field of Classification Search
CPC .......... H04R 1/24; H04R 1/2811; H04R 7/12; H04R 7/18; H04R 9/025; H04R 9/043; H04R 9/06; H04R 9/063; H04R 2209/022
See application file for complete search history.

(56) References Cited

U.S. PATENT DOCUMENTS

2013/0011000 A1* 1/2013 Xi .......................... H04R 9/025 381/412
2015/0139479 A1* 5/2015 Lai ......................... H04R 9/025 381/412
2024/0073612 A1* 2/2024 Ren .......................... H04R 7/18
2024/0073620 A1* 2/2024 Ren .......................... H04R 7/18

* cited by examiner

*Primary Examiner* — Huyen D Le
(74) *Attorney, Agent, or Firm* — Wiersch Law Group

(57) ABSTRACT

Provided is a speaker device, including a first frame, a first vibration system, a magnetic circuit system, a second frame, a second vibration system, a second voice coil, and a conductive member electrically connected to the second voice coil. The magnetic circuit system includes a lower splint, a first main magnetic steel, a first sub-magnetic steel, a pole core, a second main magnetic steel, and a second sub-magnetic steel. A magnetization direction of the first sub-magnetic steel is the same as that of the second sub-magnetic steel, a magnetization direction of the first main magnetic steel is the same as that of the second main magnetic steel, and the magnetization direction of the second main magnetic steel is opposite to that of the second sub-magnetic steel. Compared with the related art, the speaker device of the present invention has good acoustic performance.

10 Claims, 6 Drawing Sheets

B-B

A-A

B-B

SPEAKER DEVICE

CROSS-REFERENCE TO RELATED APPLICATIONS

This application is a continuation of International Application No. PCT/CN2023/125334, filed Oct. 19, 2023, the entire contents of which are incorporated herein by reference.

TECHNICAL FIELD

The present application relates to the field of electroacoustic conversion, in particular to a speaker device.

BACKGROUND

The speaker device is a transducer that converts electrical signals into sound signals. It is primarily categorized into two modes: the single vibration system and the dual vibration system. In the dual vibration system mode, the speaker device includes a first vibration system fixed to a frame for producing low-frequency sounds and a second vibration system fixed to the magnetic circuit for producing high-frequency sounds.

In the speaker device with the dual vibration system mode in the related art, since the second vibration system is fixedly supported in a central region of the magnetic circuit, which cannot be directly connected to the frame, its voice coil cannot be connected to the external circuit board through the conductive members arranged on the frame. Besides, the magnetic steel and the pole core are spaced apart to form a magnetic gap, and the voice coil is suspended in this magnetic gap. Therefore, in the speaker device of the related art, a through-hole that traverses the entire magnetic circuit system is provided at the bottom of the magnetic circuit system, and the conductive member is then inserted through this through-hole to extend beneath the second vibration system, so as to introduce electrical signals to the voice coil of the second vibration system. However, in the related art, the introduction of the through-hole reduces the overall structural integrity of the magnetic circuit system, and the magnetic steel and the pole core are spaced apart to form the magnetic gap, leading to a decrease in the overall magnetic potential of the system, i.e., the driving force is weakened, resulting in a decrease in the acoustic performance of the speaker device.

Therefore, it is necessary to provide a new speaker device to solve the above technical problem.

SUMMARY

An object of the present application is to provide a speaker device with better acoustic performance in dual vibration system mode.

In order to achieve the above object, the present application provides a speaker device, comprising:

- a first frame;
- a first vibration system, comprising:
  - a first diaphragm fixed at an outer periphery to the first frame, which is configured to produce low-frequency sounds; and
  - a first voice coil configured to drive the first diaphragm to vibrate for sound production;
- a magnetic circuit system, fixed to the first frame, a side of which close to the first vibration system is provided with a first magnetic gap, wherein the first voice coil is inserted and suspended in the first magnetic gap;

- a second frame, fixed to a top of the magnetic circuit system;
- a second vibration system, comprising:
  - a second diaphragm fixed at its outer periphery to a side of the second frame away from the magnetic circuit system, which is configured to produce high-frequency sounds; and
  - a second voice coil configured to drive the second diaphragm to vibrate for sound production, which is suspended above and spaced apart from the magnetic circuit system;
- a conductive member, extended from a bottom of the magnetic circuit system through the magnetic circuit system toward a bottom of the second diaphragm, and electrically connected to the second voice coil;

wherein the magnetic circuit system comprises:

- a lower splint, provided with a first through-hole, wherein the first through-hole is arranged through the lower splint;
- a first main magnetic steel, fixedly stacked on the lower splint, and provided with two second through-holes, wherein the two second through-holes are both arranged through the first main magnetic steel;
- a first sub-magnetic steel, fixedly stacked on the lower splint, wherein the first sub-magnetic steel is arranged around the first main magnetic steel and spaced apart from the first main magnetic steel to form the first magnetic gap;
- a pole core, comprising:
  - a pole core body, fixedly stacked on the first main magnetic steel; and
  - two third through-holes arranged through the pole core body, wherein the third through-holes are in communication with the corresponding second through-holes, respectively;
- a second main magnetic steel, fixedly stacked on the pole core body, wherein two fourth through-holes are arranged through the second main magnetic steel, and the fourth through-holes are in communication with the corresponding third through-holes, respectively; and
- a second sub-magnetic steel, fixedly stacked on the pole core body, and arranged around the second main magnetic steel; wherein the second frame is fixedly supported on a top of the second sub-magnetic steel; the second voice coil is spaced apart and suspended above the magnetic circuit system, and the second voice coil is located within a magnetic field of the second main magnetic and within a magnetic field of the second sub-magnetic steel; a magnetization direction of the first sub-magnetic steel is the same as a magnetization direction of the second sub-magnetic steel, a magnetization direction of the first main magnetic steel is same as a magnetization direction of the second main magnetic steel, and the magnetization direction of the second main magnetic steel is opposite to the magnetization direction of the second sub-magnetic steel;

wherein both ends of the conductive member are fixed to a top of the second main magnetic steel through the first through-hole, the two second through-holes, the two third through-holes, and the two fourth through-holes in sequence from a bottom of the magnetic circuit system, and are electrically connected to the second voice coil.

In one embodiment, wherein the two second through-holes are provided orthogonally to the two third through-holes, respectively; the two third through-holes are provided orthogonally to the two fourth through-holes, respectively; and orthogonal projections of the second through-holes, the third through-holes, and the fourth through-holes downwardly along a vibration direction of the second diaphragm are entirely located within the fourth through-holes.

In one embodiment, the second voice coil is a flat voice coil and an orthogonal projection of the second voice coil along a vibration direction of the second diaphragm towards the magnetic circuit system falls on the second main magnetic steel and on the second sub-magnetic steel.

In one embodiment, the conductive member comprises:

an external conductive disk abutted against a bottom of the first main magnetic steel;

two extension walls extended from opposite ends of the external conductive disk and passed through the two second through-holes, the two third through-holes, and the two fourth through-holes in sequence; and two connecting walls formed by bending and extending the two extension walls, wherein the two connecting walls are fixed to a top of the second main magnetic steel and spaced apart from each other; the two connecting walls are used to act as welding pads, and a positive terminal and a negative terminal of the second voice coil are electrically connected to the two connecting walls, respectively.

In one embodiment, the first diaphragm comprises:

a first folding ring in the shape of an annulus;

a second folding ring in the shape of an annulus, which is spaced apart from the first folding ring and arranged on an inner side of the first folding ring; and a first vibration portion in the shape of an annulus, which is formed by bending and extending an inner periphery of the first folding ring to connect to an outer periphery of the second folding ring;

wherein an outer periphery of the first folding ring is fixed to the first frame; an inner periphery of the second folding ring is fixed to a side of the second sub-magnetic steel away from the first main magnetic steel; and the first voice coil is fixed to a side of the first vibration portion close to the magnetic circuit system.

In one embodiment, the inner periphery of the second folding ring is fixed between the second frame and the second sub-magnetic steel.

In one embodiment, the first vibration system further comprises a first skeleton and an elastic support assembly, wherein the first skeleton comprises a skeleton body in the shape of an annulus for acting as the first vibration portion and a skeleton connecting portion formed by downwardly bent and extended from an outer periphery of the skeleton body; wherein one end of the elastic support assembly is fixed to the first frame, and the other end of the elastic support assembly is fixed to the skeleton connecting portion.

In one embodiment, the second diaphragm comprises a second vibration portion, a third folded ring formed by an outward extension of an outer periphery of the second vibration portion and in the shape of an annulus, and a dome covered on the second vibration portion, wherein an outer periphery of the third folded ring is fixed to a side of the second frame away from the second sub-magnetic steel, and the second voice coil is fixed to the second vibration portion.

In one embodiment, the magnetic circuit system further comprises an upper splint, wherein the upper splint is fixedly stacked on the first sub-magnetic steel and fixedly connected to the first frame.

In one embodiment, the speaker device further comprises a dust cover, wherein the dust cover comprises a cover body in the shape of an annulus and fixed to a periphery of the lower splint, a cover wall formed by bending and extending from opposite sides of the cover body, and a plurality of air holes arranged through the cover wall, wherein the cover wall is fixedly connected to the first frame.

Compared with the related art, in the speaker device of the present application, the lower splint of the magnetic circuit system is equipped with a first through-hole; the first main magnetic steel is fixedly stacked on the lower splint, and the first main magnetic steel is equipped with two second through-holes; the first sub-magnetic steel is arranged around the first main magnetic steel and spaced from the first main magnetic steel to form a first magnetic gap; the pole core includes a ring-shaped pole core body fixedly stacked on the first main magnetic steel and two third through-holes arranged through the pole core body; the second main magnetic steel is fixedly stacked on the pole core body, and the second main magnetic steel is provided with two fourth through-holes; the second sub-magnetic steel is fixedly stacked on the pole core body, and the second sub-magnetic steel is arranged around the second main magnetic steel. The second frame is fixedly supported on the top of the second sub-magnetic steel, the second voice coil is spaced apart and suspended above the magnetic circuit system, and the second voice coil is located within a magnetic field range of the second main magnetic steel as well as within a magnetic field range of the second sub-magnetic steel. A magnetization direction of the first vice magnetic steel is the same as a magnetization direction of the second sub-magnetic steel, a magnetization direction of the main magnetic steel is the same as a magnetization direction of the second main magnetic steel, and the magnetizing direction of the second main magnetic steel is the opposite to the magnetizing direction of the second sub-magnetic steel. Therefore, the driving performance of the overall magnetic circuit system is increased, and the acoustic performance of the microphone member is improved. Both ends of the conductive member are extended from the bottom of the magnetic circuit system through the first through-hole, the two second through-holes, the third through-holes and the fourth through-hole in sequence to fix to the top of the second main magnetic steel, and are electrically connected to the second voice coil, to maximize the volume of the magnetic steels, thus improving the performance of the magnetic circuit system.

BRIEF DESCRIPTION OF THE DRAWINGS

In order to illustrate the technical solutions in the embodiments of the present application more clearly, the accompanying drawings to be used in the description of the embodiments will be briefly introduced below. Obviously, the accompanying drawings in the following description are only some embodiments of the present application, and for those of ordinary skill in the field, other accompanying drawings may be obtained based on these drawings without creative labor.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application and not all of the embodiments. Based on the embodiments in the present application, all other embodiments obtained by those of ordinary skill in the art without making creative labor are within the protection scope of the present application.

Figure 1:
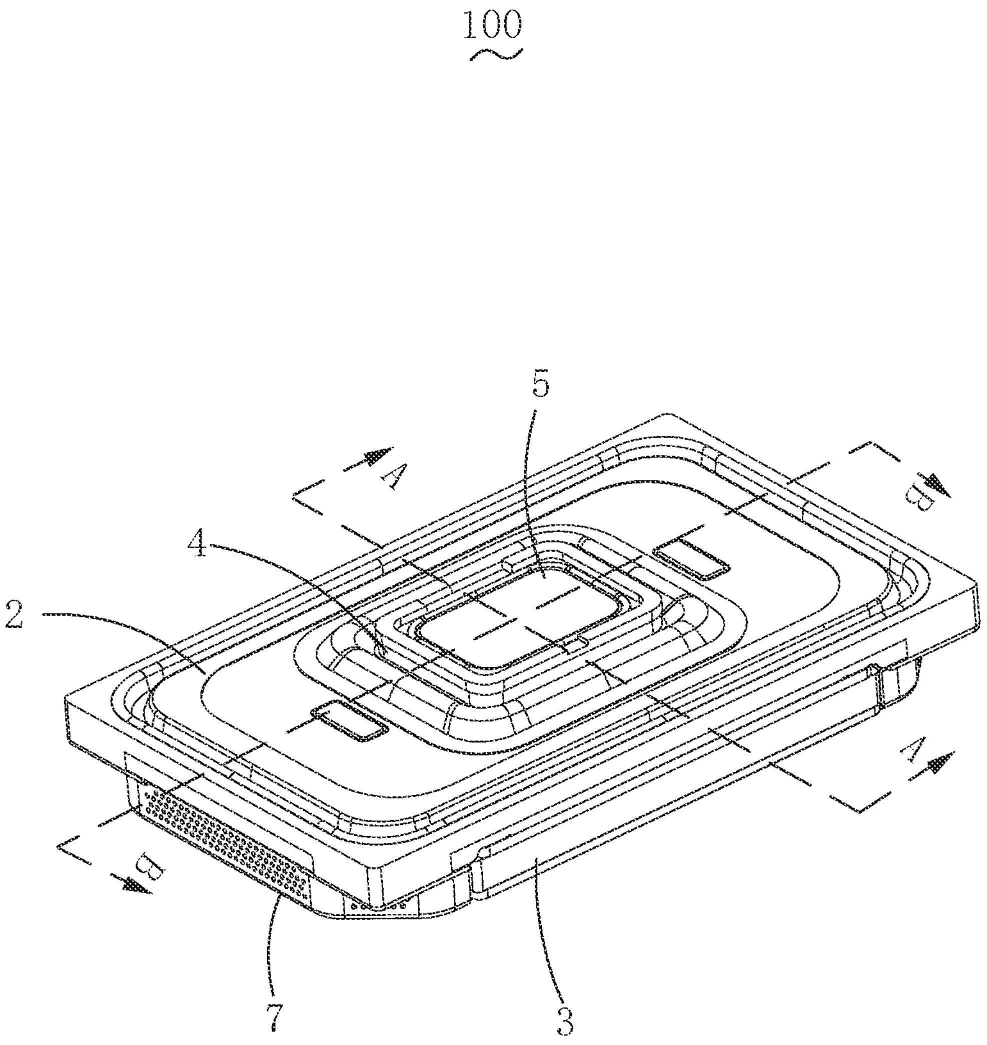
FIG. 1 shows a three-dimensional structural diagram of a speaker device according to an embodiment of the present application.
Figure 2:
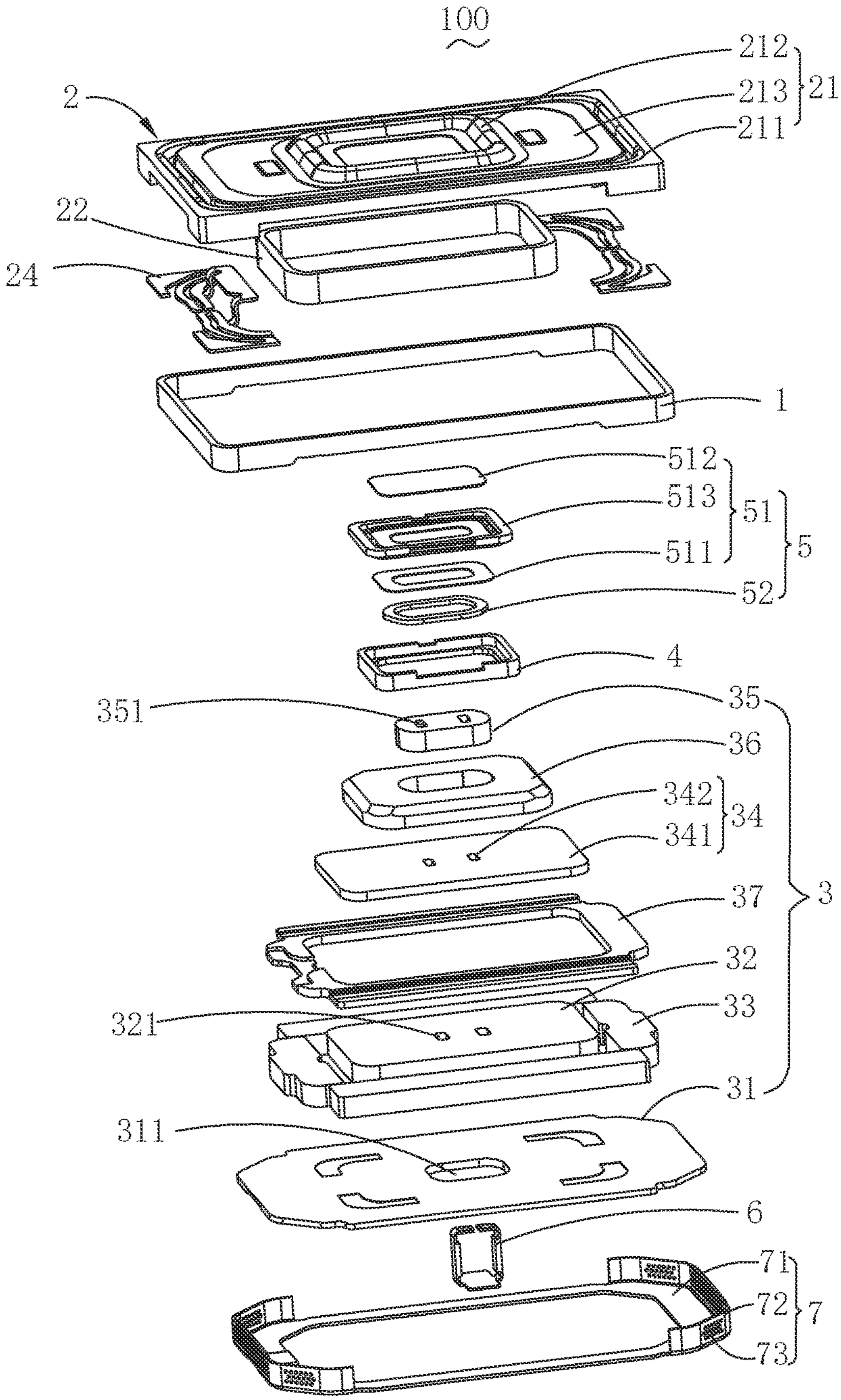
FIG. 2 shows a three-dimensional exploded view of the speaker device according to an embodiment of the present application.
Figure 3:
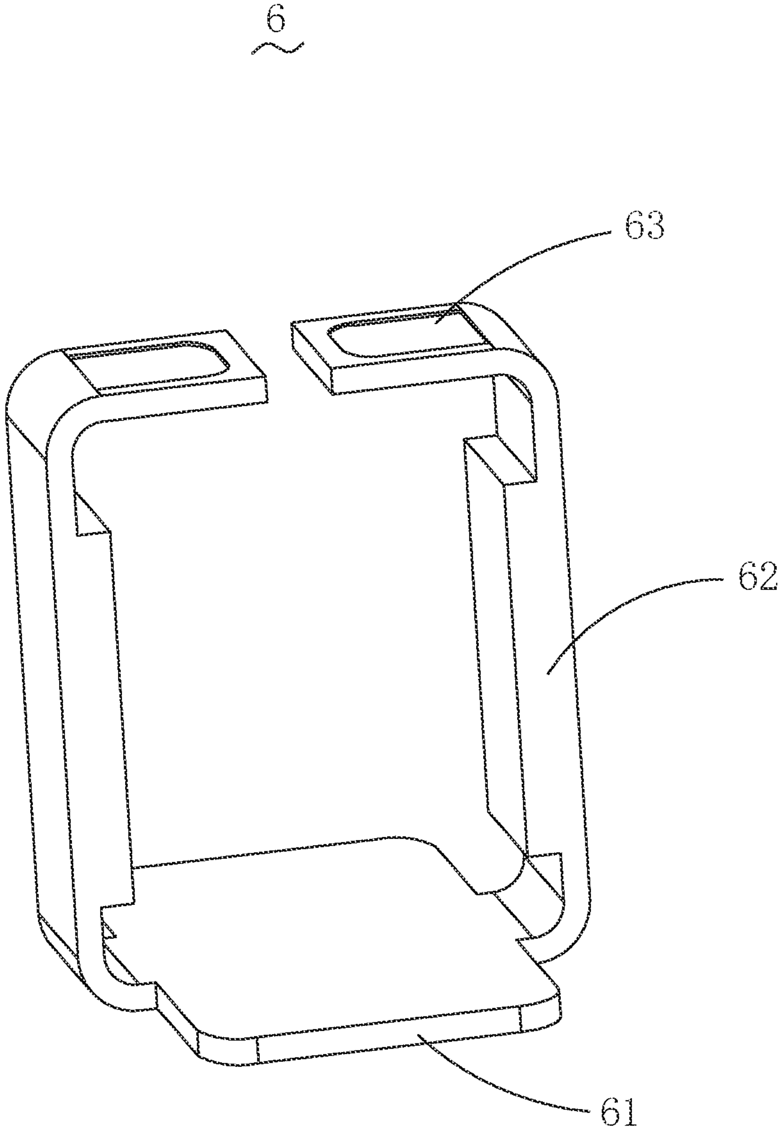
FIG. 3 shows a structural diagram of a conductive member according to an embodiment of the present application.
Figure 4:
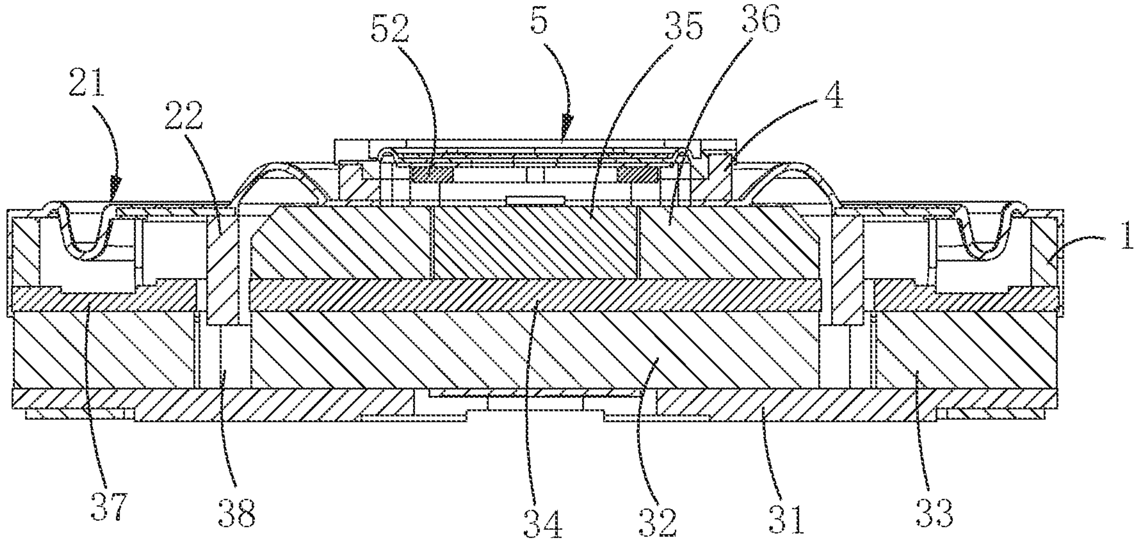
FIG. 4 shows a sectional view of line A-A in FIG. 1.
Figure 5:
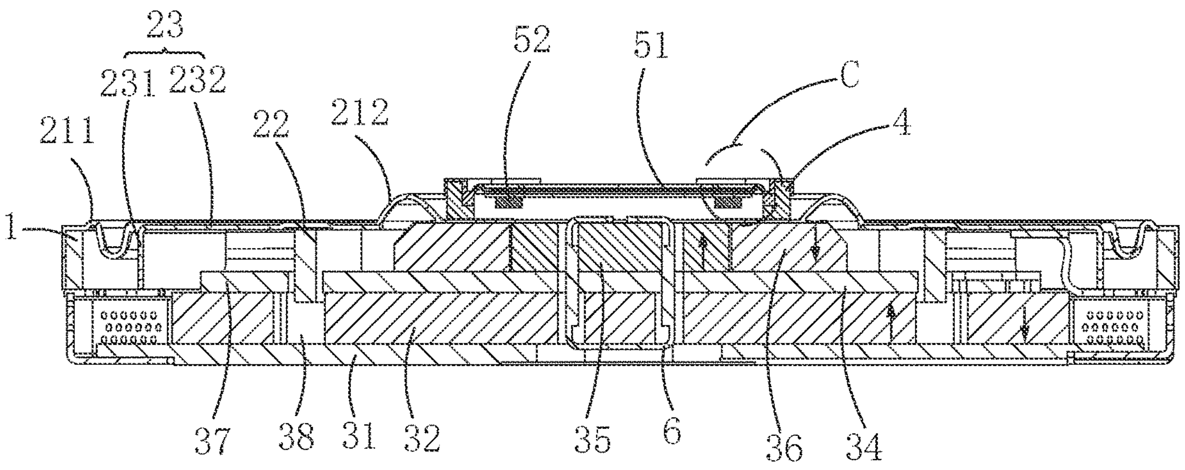
FIG. 5 shows a sectional view of line B-B in FIG. 1.
Figure 6:
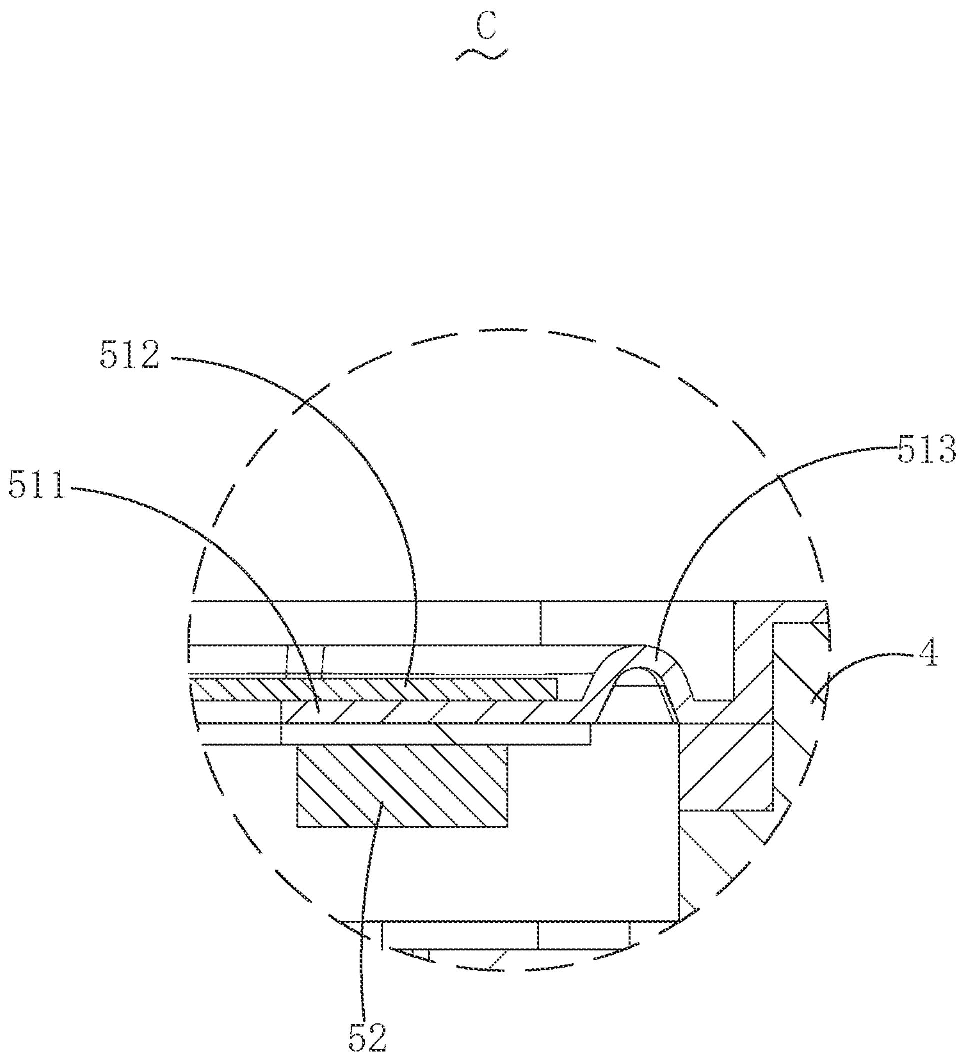
FIG. 6 shows a partially enlarged view of C in FIG. 5.

Combined with FIGS. 1 to 6, embodiments of the present application provide a speaker device 100, including a first frame 1, a first vibration system 2, a magnetic circuit system 3, a second frame 4, a second vibration system 5, and a conductive member 6.

The first frame 1 is configured to fixedly support the first vibration system 2 and the magnetic circuit system 3. In this embodiment, the first frame 1 is a ring-like structure surrounded by a metal material.

The first vibration system 2 includes a first diaphragm 21 fixed to the first frame 1 at its outer periphery, and a first voice coil 22 configured to drive the first diaphragm 21 to vibrate for sound production. The first diaphragm 21 is configured to generate low-frequency sounds, that is, the bass sounds.

The magnetic circuit system 3 is fixed to the first frame 1, and the magnetic circuit system 3 is provided with a first magnetic gap 38 on a side close to the first vibration system 2. The first voice coil 22 is inserted and suspended in the first magnetic gap 38.

The second frame 4 is fixed to the top of the magnetic circuit system 3. In this embodiment, the second frame 4 is a ring-like structure surrounded by a metallic material.

The second vibration system 5 includes a second diaphragm 51 fixed to a side of the second frame 4 away from the magnetic circuit system 3 at its outer periphery and a second voice coil 52 configured to drive the second diaphragm 51 to vibrate for sound production. The second voice coil 52 is suspended above and spaced from the magnetic circuit system 3. The second diaphragm 51 is configured to produce high-frequency sound, that is, treble sounds. The first vibration system 2 and the second vibration system 5 share the magnetic circuit system 3, and are driven by the magnetic circuit system 3 to produce sounds in different frequency bands, respectively.

The conductive member 6 is extended from a bottom of the magnetic circuit system 3 through the magnetic circuit system 3 to a bottom of the second diaphragm 51, and is electrically connected to the second voice coil 52.

In this embodiment, the magnetic circuit system 3 includes a lower splint 31, a first main magnetic steel 32, a first sub-magnetic steel 33, a pole core 34, a second main magnetic steel 35, a second sub-magnetic steel 36, and an upper splint 37.

The lower splint 31 is provided with a first through-hole 311, and the first through-hole 311 is arranged through the lower splint 31.

The first main magnetic steel 32 is fixedly stacked on the lower splint 31, and the first main magnetic steel 32 is provided with two second through-holes 321, and the two second through-holes 321 are arranged through the first main magnetic steel 32. Since the first main magnetic steel 32 is not completely hollowed out in the middle for displacement; instead, it is retained by setting the two second through-holes 321, which preserves the portion of the first main magnetic steel 32 between the two second through-holes 321. This preservation maximizes the overall effective volume of the first main magnetic steel 32, providing greater magnetic field performance.

The first sub-magnetic steel 33 is fixedly stacked on the lower splint 31, and arranged around the first main magnetic steel 32, and spaced from the first main magnetic steel 32 to form the first magnetic gap 38.

The pole core 34 includes a pole core body 341 fixedly stacked on the first main magnetic steel 32 and two third through-holes 342 through the pole core body 341. The third through-holes 342 is connected to the corresponding second through-holes 321, respectively. The pole core 34 is configured to conduct magnetism to the first main magnetic steel 32. The pole core 34 is covered on the first main magnetic steel 32 to reduce the loss of magnetism generated by the first main magnetic steel 32, thereby improving the magnetic field performance. The third through-holes 342 are provided, so that the conductive member 6 is extended to the second voice coil 52 through the third through-holes 342, to realize the electrical connection.

The second main magnetic steel 35 is fixedly stacked on the pole core body 341. The second main magnetic steel 35 is provided with two fourth through-holes 351, and the two fourth through-holes 351 are arranged through the second main magnetic steel 35. The fourth through-holes 351 are connected to the corresponding third through-holes 342, respectively.

The second sub-magnetic steel 36 is fixedly stacked on the pole core body 341, and arranged around the second main magnetic steel 35. The second frame 4 is fixedly supported on the top of the second sub-magnetic steel 36. The second voice coil 52 is spaced apart and suspended above the magnetic circuit system 3, and arranged within a magnetic field range of the second main magnetic steel 35 as well as within the magnetic field range of the second sub-magnetic steel 36. A magnetization direction of the first sub-magnetic steel 33 is the same as a magnetization direction of the second sub-magnetic steel 36, a magnetization direction of the first main magnetic steel 32 is the same as a magnetization direction of the second main magnetic steel 35, and the magnetization direction of the second main magnetic steel 35 is opposite to the second sub-magnetic steel 36. The second main magnetic steel 35 is a high-frequency sound magnetic steel, the second sub-magnetic steel 36 is a low-frequency sound sub-magnetic steel. The pole core 34 is a high-frequency sound pole core 34, so by utilizing the characteristic of the second main magnetic steel 35 having a smaller amplitude by itself, the magnetic circuit setting of the magnetic circuit system 3 is adjusted to increase the driving performance of the overall magnetic circuit system 3, and to improve the acoustic performance of the speaker device 100.

The magnetizing direction of the first sub-magnetic steel 33 is in a direction from the first vibration system 2 towards the magnetic circuit system 3.

The upper splint 37 is fixedly stacked on the first sub-magnetic steel 33 and is fixedly connected to the first frame 1.

Both ends of the conductive member 6 are extended from the bottom of the magnetic circuit system 3 through the first through-hole 311, the two second through-holes 321, the two third through-holes 342, and the two fourth through-holes 351 to fixed to the top of the second main magnetic steel 35, and electrically connected to the second voice coil 52.

In this embodiment, the two second through-holes 321 are each provided orthogonally to the two third through-holes 342, and the two third through-holes 342 are each provided orthogonally to the two fourth through-holes 351. The orthogonal projections of the second through-holes 321, the third through-holes 342, and the fourth through-holes 351 downwardly along the vibration direction of the second diaphragm 51 are entirely within the fourth through-holes 351. The conductive member 6 is arranged through the second through-holes 321, the third through-holes 342, and the fourth through-holes 351, the conductive member 6 is not bent, so that the second voice coil 52 is conductive better, and it is easy to arrange.

In this embodiment, the second voice coil 52 is a flat voice coil, and an orthogonal projection of the second voice coil 52 along a vibration direction of the second diaphragm 51 towards the magnetic circuit system 3 falls on the second main magnetic steel 35 and on the second sub-magnetic steel 36. The second voice coil 52 is made by means of flat winding, and the thickness of the second voice coil 52 is less than the width of a winding area of the second voice coil 52. The second voice coil 52 is suspended above a middle position of the second main magnetic steel 35 and the second sub-magnetic steel 36. Therefore, the arrangement space of the second voice coil 52 is saved, and the volume of the second main magnetic steel 35 is enhanced, thereby increasing the driving force of the overall magnetic circuit system 3 and improving the acoustic performance.

In this embodiment, the conductive member 6 includes an external conductive disk 61 abutted against the bottom of the first main magnetic steel 32, two extension walls 62 which are bent and extended from opposite ends of the external conductive disk 61 and passed through the two second through-holes 321, the two third through-holes 342 and the two fourth through-holes 351 in sequence, and two extension walls 62 which are formed by bending and extending the two extension walls. The two extension walls 62 are fixed to a top of the second main magnetic steel 35 and spaced apart from each other. The two connection walls 63 are used to act as welding pads, and a positive terminal and a negative terminal of the second voice coil 52 are electrically connected to the two connection walls 63, respectively. An external power supply is connected through the external conductive disk 61, and the external power supply transmits the electrical energy towards the extension walls 62 and the connection walls 63. A positive terminal and a negative terminal of the second voice coil 52 are electrically connected to the two connection walls 63, respectively, thereby supplying the electrical energy to the second voice coil 52, and driving the second diaphragm 51 to vibrate for sound production.

In this embodiment, the first diaphragm 21 includes a first folding ring 211 in the shape of an annulus, a second folding ring 212 in the shape of an annulus spaced apart from the first folding ring and arranged on an inner side of the first folding ring 211, and a first vibration portion 213 in the shape of an annulus, which is formed by bending and extending an inner periphery of the first folding ring 211 to connect to an outer periphery of the second folding ring 212. An outer periphery of the first folding ring 211 is fixed to the first frame 1, and an inner periphery of the second folding ring 212 is fixed to a side of the second sub-magnetic steel 36 away from the first main magnetic steel 32. The first voice coil 22 is fixed to a side of the first vibration portion 213 close to the magnetic circuit system 3. The first vibration portion 213 is configured to drive the first voice coil 22 to vibrate, and the first vibration portion 213 is connected to the first folding ring 211 and the second folding ring 212, so as to improve the acoustic performance of the first diaphragm 21.

In this embodiment, the inner periphery of the second folding ring 212 is fixed between the second frame 4 and the second sub-magnetic steel 36, thereby increasing the fixation performance of the inner periphery of the second folded ring 212.

In this embodiment, the first vibration system 2 further includes a first skeleton 23 and an elastic support assembly 24. The first skeleton 23 includes a skeleton body 232 in the shape of an annulus for acting as the first vibration portion 213, and a skeleton connecting portion 231 formed by downwardly bent and extended from an outer periphery of the skeleton body 232. One end of the elastic support assembly 24 is fixed to the first potting frame 1, and the other end of the elastic support assembly 24 is fixed to the skeleton connecting portion 231.

The first skeleton 23 is configured to improve the fixation performance of the first diaphragm 21, and facilitate the arrangement and fixation of the first voice coil 22, so that the first voice coil 22 is suspended within the first magnetic gap 38, and the first voice coil 22 is well stabilized during the vibration of the first diaphragm 21. The elastic support assembly 24 is configured to increase the vibration strength of the first diaphragm 21, so as to improve the sound loudness and sensitivity, and further prevent the first voice coil 22 from generating transverse oscillation during vibration, thereby improving reliability.

In an embodiment, the elastic support assembly 24 is a flexible circuit board. The first voice coil 22 may be electrically connected to the flexible circuit board, so that the elastic support assembly 24 may also be configured to introduce an electrical signal to the first voice coil 22, avoiding breakage of wires by means of a lead wire, and improving its reliability. The flexible support assembly 24 may be directly connected to the first voice coil 22, or may be indirectly connected to the first voice coil 22 through the first skeleton 23.

In this embodiment, the second diaphragm 51 includes a second vibration portion 511, a third folded ring 513 formed by an outward extension of an outer periphery of the second vibration portion 511 and in the shape of an annulus, and a dome 512 covered on the second vibration portion 511. An outer periphery of the third folded ring 513 is fixed to a side of the second frame 4 away from the second sub-magnetic steel 36, and the second voice coil 52 is fixed to the second vibration section 511. The conductive member 6 is connected to the external power supply to drive the second voice coil 52 to drive the second vibration portion 511 to vibrate, to enhance the vibration performance of the second diaphragm 51 by means of the third folding ring 513, thereby enhancing the vibration performance of the second vibration system 5, and improving the acoustic performance of the speaker device 100.

In this embodiment, the dome 512 is located on a side of the second vibration portion 511 away from the magnetic circuit system 3, and the second voice coil 52 is fixed on a side of the second vibration portion 511 close to the magnetic circuit system 3. Therefore, the fixation effect of the second vibration section 511 and the second voice coil 52 is enhanced, thereby preventing the second voice coil 52 from falling off during vibration.

In this embodiment, the speaker device 100 further includes a dust cover 7, which includes a cover body 71 in the shape of an annulus and fixed to the periphery of the lower splint 31, a cover wall 72 formed by bending and extending from opposite sides of the cover body 71, and a plurality of air holes 73 arranged through the cover wall 72. The cover wall 72 is fixedly connected to the first frame 1. The cover wall 72 may be located at any of the positions of the four corners, the position of the long-axis side, and the position of the short-axis side of the lower splint 31.

Compared with the related art, in the speaker device of the present application, the lower splint of the magnetic circuit system is equipped with a first through-hole; the first main magnetic steel is fixedly stacked on the lower splint, and the first main magnetic steel is equipped with two second through-holes; the first sub-magnetic steel is arranged around the first main magnetic steel and spaced from the first main magnetic steel to form a first magnetic gap; the pole core includes a ring-shaped pole core body fixedly stacked on the first main magnetic steel and two third through-holes arranged through the pole core body; the second main magnetic steel is fixedly stacked on the pole core body, and the second main magnetic steel is provided with two fourth through-holes; the second sub-magnetic steel is fixedly stacked on the pole core body, and the second sub-magnetic steel is arranged around the second main magnetic steel. The second frame is fixedly supported on the top of the second sub-magnetic steel, the second voice coil is suspended at intervals above the magnetic circuit system, and the second voice coil is located within a magnetic field range of the second main magnetic steel as well as within a magnetic field range of the second sub-magnetic steel. A magnetization direction of the first vice magnetic steel is the same as a magnetization direction of the second sub-magnetic steel, a magnetization direction of the main magnetic steel is the same as a magnetization direction of the second main magnetic steel, and the magnetizing direction of the second main magnetic steel is the opposite to the magnetizing direction of the second sub-magnetic steel. Therefore, the driving performance of the overall magnetic circuit system is increased, and the acoustic performance of the microphone member is improved. Both ends of the conductive member are extended from the bottom of the magnetic circuit system through the first through-hole, the two second through-holes, the third through-holes, and the fourth through-hole in sequence to fix to the top of the second main magnetic steel, and are electrically connected to the second voice coil, to maximize the volume of the magnetic steels, thus improving the performance of the magnetic circuit system.

Described above are only some embodiments of the present application, and it should be noted herein that improvements may be made by those of ordinary skill in the art without departing from the inventive conception of the present application, but all of these fall within the protection scope of the present application.

What is claimed is:

1. A speaker device, comprising:

a first frame;

a first vibration system, comprising:

a first diaphragm fixed at an outer periphery to the first frame, which is configured to produce low-frequency sounds; and a first voice coil configured to drive the first diaphragm to vibrate for sound production;

a magnetic circuit system, fixed to the first frame, a side of which close to the first vibration system is provided with a first magnetic gap, wherein the first voice coil is inserted and suspended in the first magnetic gap;

a second frame, fixed to a top of the magnetic circuit system;

a second vibration system, comprising:

a second diaphragm fixed at its outer periphery to a side of the second frame away from the magnetic circuit system, which is configured to produce high-frequency sounds; and a second voice coil configured to drive the second diaphragm to vibrate for sound production, which is suspended above and spaced apart from the magnetic circuit system;

a conductive member, extended from a bottom of the magnetic circuit system through the magnetic circuit system toward a bottom of the second diaphragm, and electrically connected to the second voice coil;

wherein the magnetic circuit system comprises:

a lower splint, provided with a first through-hole, wherein the first through-hole is arranged through the lower splint;

a first main magnetic steel, fixedly stacked on the lower splint, and provided with two second through-holes, wherein the two second through-holes are both arranged through the first main magnetic steel;

a first sub-magnetic steel, fixedly stacked on the lower splint, wherein the first sub-magnetic steel is arranged around the first main magnetic steel and spaced apart from the first main magnetic steel to form the first magnetic gap;

a pole core, comprising:

a pole core body, fixedly stacked on the first main magnetic steel; and two third through-holes arranged through the pole core body, wherein the third through-holes are in communication with the corresponding second through-holes, respectively;

a second main magnetic steel, fixedly stacked on the pole core body, wherein two fourth through-holes are arranged through the second main magnetic steel, and the fourth through-holes are in communication with the corresponding third through-holes, respectively; and a second sub-magnetic steel, fixedly stacked on the pole core body, and arranged around the second main magnetic steel; wherein the second frame is fixedly supported on a top of the second sub-magnetic steel; the second voice coil is spaced apart and suspended above the magnetic circuit system, and the second voice coil is located within a magnetic field of the second main magnetic and within a magnetic field of the second sub-magnetic steel; a magnetization direction of the first sub-magnetic steel is the same as a magnetization direction of the second sub-magnetic steel, a magnetization direction of the first main magnetic steel is same as a magnetization direction of the second main magnetic steel, and the magnetization direction of the second main magnetic steel is opposite to the magnetization direction of the second sub-magnetic steel;

wherein both ends of the conductive member are fixed to a top of the second main magnetic steel through the first through-hole, the two second through-holes, the two third through-holes, and the two fourth through-holes in sequence from a bottom of the magnetic circuit system, and are electrically connected to the second voice coil.

2. The speaker device of claim 1, wherein the two second through-holes are provided orthogonally to the two third through-holes, respectively; the two third through-holes are provided orthogonally to the two fourth through-holes, respectively; and orthogonal projections of the second through-holes, the third through-holes, and the fourth through-holes downwardly along a vibration direction of the second diaphragm are entirely located within the fourth through-holes.

3. The speaker device of claim 1, wherein the second voice coil is a flat voice coil and an orthogonal projection of the second voice coil along a vibration direction of the second diaphragm towards the magnetic circuit system falls on the second main magnetic steel and on the second sub-magnetic steel.

4. The speaker device of claim 1, wherein the conductive member comprises:

an external conductive disk abutted against a bottom of the first main magnetic steel;

two extension walls extended from opposite ends of the external conductive disk and passed through the two second through-holes, the two third through-holes, and the two fourth through-holes in sequence; and two connecting walls formed by bending and extending the two extension walls, wherein the two connecting walls are fixed to a top of the second main magnetic steel and spaced apart from each other; the two connecting walls are used to act as welding pads, and a positive terminal and a negative terminal of the second voice coil are electrically connected to the two connecting walls, respectively.

5. The speaker device of claim 1, wherein the first diaphragm comprises:

a first folding ring in the shape of an annulus;

a second folding ring in the shape of an annulus, which is spaced apart from the first folding ring and arranged on an inner side of the first folding ring; and a first vibration portion in the shape of an annulus, which is formed by bending and extending an inner periphery of the first folding ring to connect to an outer periphery of the second folding ring;

wherein an outer periphery of the first folding ring is fixed to the first frame; an inner periphery of the second folding ring is fixed to a side of the second sub-magnetic steel away from the first main magnetic steel; and the first voice coil is fixed to a side of the first vibration portion close to the magnetic circuit system.

6. The speaker device of claim 5, wherein the inner periphery of the second folding ring is fixed between the second frame and the second sub-magnetic steel.

7. The speaker device of claim 6, wherein the first vibration system further comprises a first skeleton and an elastic support assembly, wherein the first skeleton comprises a skeleton body in the shape of an annulus for acting as the first vibration portion and a skeleton connecting portion formed by downwardly bent and extended from an outer periphery of the skeleton body; wherein one end of the elastic support assembly is fixed to the first frame, and the other end of the elastic support assembly is fixed to the skeleton connecting portion.

8. The speaker device of claim 1, wherein the second diaphragm comprises a second vibration portion, a third folded ring formed by an outward extension of an outer periphery of the second vibration portion and in the shape of an annulus, and a dome covered on the second vibration portion, wherein an outer periphery of the third folded ring is fixed to a side of the second frame away from the second sub-magnetic steel, and the second voice coil is fixed to the second vibration portion.

9. The speaker device of claim 1, wherein the magnetic circuit system further comprises an upper splint, wherein the upper splint is fixedly stacked on the first sub-magnetic steel and fixedly connected to the first frame.

10. The speaker device of claim 1, further comprising a dust cover, wherein the dust cover comprises a cover body in the shape of an annulus and fixed to a periphery of the lower splint, a cover wall formed by bending and extending from opposite sides of the cover body, and a plurality of air holes arranged through the cover wall, wherein the cover wall is fixedly connected to the first frame.

* * * * *